US005930100A

United States Patent [19]

Gasque, Jr.

[11] Patent Number: 5,930,100

[45] Date of Patent: Jul. 27, 1999

[54] LIGHTNING RETARDANT CABLE

[75] Inventor: Samuel N. Gasque, Jr., Hendersonville, N.C.

[73] Assignee: Marilyn A. Gasque, Hendersonville, N.C.

[21] Appl. No.: 09/066,237

[22] Filed: Apr. 24, 1998

Related U.S. Application Data

[63] Continuation-in-part of application No. 08/741,536, Oct. 31, 1996, Pat. No. 5,744,755.

[51] Int. Cl.[6] .............................. H02H 1/04; H02H 3/22

[52] U.S. Cl. ............................ 361/117; 361/110; 174/108

[58] Field of Search ............................ 361/91, 110, 111, 361/113, 107, 108, 117, 118, 119; 174/36, 35 R, 35 CE, 37, 38, 78, 106 R, 108, 102 R, 105 R, 107, 109; 333/12, 236, 243; 385/100, 107, 113

[56] References Cited

U.S. PATENT DOCUMENTS

| | | | |
|---|---|---|---|
| 3,297,814 | 1/1967 | McClean et al. | 174/106 R X |
| 3,351,706 | 11/1967 | Gnerre et al. | 174/108 X |
| 3,484,679 | 12/1969 | Hodgson et al. | 333/243 X |
| 4,119,793 | 10/1978 | Rabinowitz | 174/36 |
| 4,268,714 | 5/1981 | Mori | 174/108 |
| 4,301,428 | 11/1981 | Mayer | 333/243 X |
| 4,687,882 | 8/1987 | Stone et al. | 174/102 SC |
| 4,719,319 | 1/1988 | Tighe, Jr. | 174/106 R X |
| 4,738,734 | 4/1988 | Ziemek | 174/108 X |
| 4,816,614 | 3/1989 | Baigrie et al. | 333/243 X |
| 5,061,823 | 10/1991 | Carroll | 174/108 X |
| 5,218,167 | 6/1993 | Gasque, Jr. | 174/37 |
| 5,235,299 | 8/1993 | Vaille et al. | 333/243 |
| 5,325,457 | 6/1994 | Bottoms, Jr. et al. | 385/113 |

*Primary Examiner*—Ronald W. Leja
*Attorney, Agent, or Firm*—Carter & Schnealer, P.A.

[57] ABSTRACT

There is provided a cable which retards lightning. The cable includes at least one internal conductor which may be a power conductor or a signal conductor. A choke conductor is wound about the internal conductor in the shape of a spiral. If lightning strikes near the cable or a device which is attached to the cable, such as an antenna, the choke conductor presents a high impedance to the current caused by lightning and will prevent the lightning current from flowing down the choke conductor, thus entering the internal conductor, thereby preventing damage to the internal conductor and any associated electronic equipment. Preferably, a shield is also spiraled wound about the internal conductor adjacent to the choke conductor in a direction opposite to the choke conductor, whereby the angle formed by the crossing of the choke conductor and the shield is approximately 90° to block the magnetic field component of the lightning discharge.

24 Claims, 4 Drawing Sheets

LIGHTNING RETARDANT CABLE

RELATED APPLICATION

This is a continuation-in-part of U.S. Pat. No. 5,744,755, issued on Apr. 28, 1998 to Samuel N. Gasque, Jr., titled "LIGHTNING RETARDANT CABLE" and assigned to Marilyn A. Gasque.

BACKGROUND OF THE INVENTION

This invention relates to electrical cable. More particularly, it relates to electrical cable which retards lightning so that the cable is not substantially affected by the lightning and, in the case of communication cable, the communication signal on a signal conductor within the cable is not substantially affected, as well as its associated equipment.

While this invention is applicable to both power and communication cable, most of the detailed discussion herein will focus on communication cable used in conjunction with an antenna.

As used herein, the term antenna includes television and radio antenna, satellite dishes and other devices which receive electromagnetic signals. A major problem associated with an antenna is caused by lightning striking the antenna. Often the high current associated with the lightning will travel through the communication cable which is attached between the antenna and electronic equipment. This current will damage the electronic equipment.

According to *The Lightning Book,* by Peter E. Viemeister, self-induction in a conductor may occur during a lightning strike. This occurs because lightning currents may rise at a rate of about 15,000 amperes in a millionth of a second. For a straight conductor with the usual cross section, this surging current can produce nearly 6,000 volts per foot of wire, which is enough to jump an insulated gap to a nearby conductor, such as the center conductor, in a coaxial cable.

Currently lightning protection of cable is more focused on the installation of cable within a system. The National Electric Code attempts to insure a proper path for lightning to discharge, thus reducing the damage of equipment connected to the end of the cable. The cable in and of itself offers little or no protection from electric fields or magnetic fields associated with the lightning strike. Even though electrical codes provide suggestions on installing and grounding equipment, their primary focus is providing a straight path to ground for lightning to discharge and eliminating the differences of potential between the two items.

FIG. 1 is an example of a home TV antenna installation according to the National Electric Code. If lightning were to strike antenna 10, half of the charge would be on ground wire 12 which is attached to the mast 14 of the antenna, and the other half would be on the coaxial cable's outer shield 16 which is connected to the antenna terminals 18. Theoretically, the current on coaxial cable 16 would travel to antenna discharging unit 20 and then through grounding conductor 22. The center conductor or signal conductor of the coaxial cable, however, is unprotected, which means that damage to the electronics in the receiver and other components within the home is likely. Furthermore, the longer the lead-in wire, the greater the problem. As lightning strikes this antenna 10 and discharges to ground, a large electric field is set up along the coaxial lead-in wire 16 and ground wire 12. At right angles to this electric field is an exceptionally strong magnetic field which surrounds all of the cable.

In addition, lightning follows the straightest, closest and best path to ground. Any sharp bends, twists or turns of the ground wire sets up resistance to the quick discharges See Page 201 of *The Lightning Book,* referred to above. This resistance usually causes the discharge to jump off the ground wire with the bend and into a path of least resistance.

OBJECTS OF THE INVENTION

It is one object of this invention to provide an improved lightning retardant cable.

It is another object to provide a lightning retardant cable which deals with both electric and magnetic fields caused by lightning.

SUMMARY OF THE INVENTION

In accordance with one form of this invention there is provided a lightning retardant cable which includes at least one internal conductor. The internal conductor may be a signal conductor or a power conductor. A signal conductor conducts a signal containing information. A power conductor conducts current for operating devices and equipment.

A choke conductor is provided. The choke conductor is wound about the internal conductor in the shape of a spiral. The choke conductor is not in contact with the internal conductor. The choke conductor presents a high impedance to the electrical current caused by lightning when the lightning strikes near the cable.

Preferably, the internal conductor is made of metal for conducting electrical signals or current, although the internal conductor may be an optical fiber.

It is also preferred that a spiraled shield be placed underneath the choke conductor. The spiraled shield is also wound about the internal conductor, but in an opposite direction to the choke conductor. The adjacent windings of the shield are not in electrical contact with one another and act as another choke. Preferably, 90° angles are formed at the crossing points between the choke conductor and the shield.

The choke conductor dissipates the electric field caused by the lightning strike. The shield performs two functions. It acts as a choke in the opposite direction of the choke conductor and thus enhancing the cancellation process and it acts as a Faraday Cage to greatly reduce the associated magnetic field.

It is also preferred that one side of the shield be insulated so that when the shield is wound about the cable a winding is not in electrical contact with the previous or next winding. This forms a choke shield. The choke conductor may also be insulated. In addition, one end of the insulated choke conductor may be electrically connected to one end of the shield.

It is also preferred that an overall outer jacket be provided for the cable and that a ground conductor be attached to the outer jacket.

BRIEF DESCRIPTION OF THE DRAWINGS

The subject matter which is regarded as the invention is set forth in the appended claims. The invention itself, however, together with further objects and advantages thereof may be better understood in reference to the accompanying drawings in which:

DESCRIPTION OF THE PREFERRED EMBODIMENTS

Figure 3:
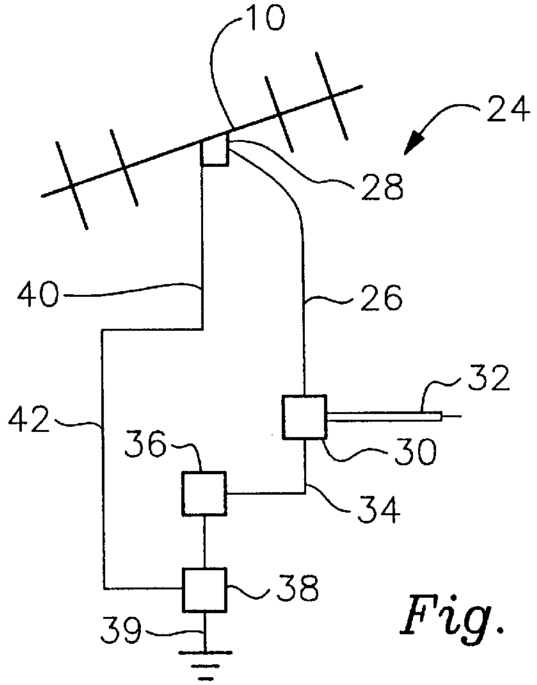
FIG. 3 is also a simplified electrical diagram showing the antenna signal transmission and grounding system of the subject invention.

Referring now more particularly to FIG. 3 which relates to an embodiment of the invention where the lightning retardant cable is a communication cable, there is provided antenna signal transmission and grounding system 24 for grounding antenna 10. As previously indicated, antenna 10 may also be a satellite dish or another device for receiving signals from the air. System 24 includes lightning retardant cable 26, which is the cable of the subject invention and will be described in more detail below. Lightning retardant cable 26 is attached to antenna 10 at connector lead box 28. Cable 26 is also connected to standard antenna discharge unit 30. A typical antenna discharge unit 30 is a Tru Spec commercially available from C Z Labs. A coaxial cable 32 is connected to the discharge unit 30 and to electronic equipment (not shown).

A ground wire 34 connects the antenna discharge unit 30 to ground clamps 36 and 38. Ground clamp 38 is, in turn, connected to ground rod 39. In addition, the antenna mast 40 is connected to ground clamp 38 through ground wire 42.

Figure 1:
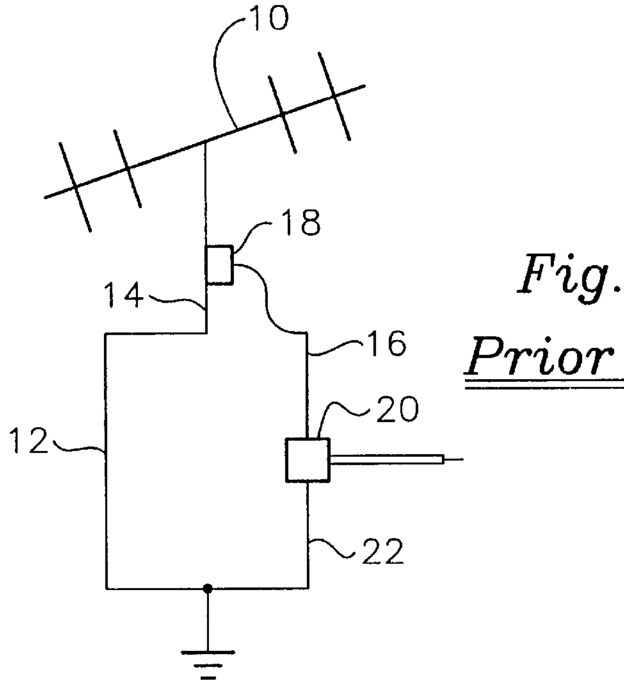
Fig. 1 Prior Art
FIG. 1 is a simplified electrical diagram showing a prior art antenna signal transmission and grounding system.
Figure 2:
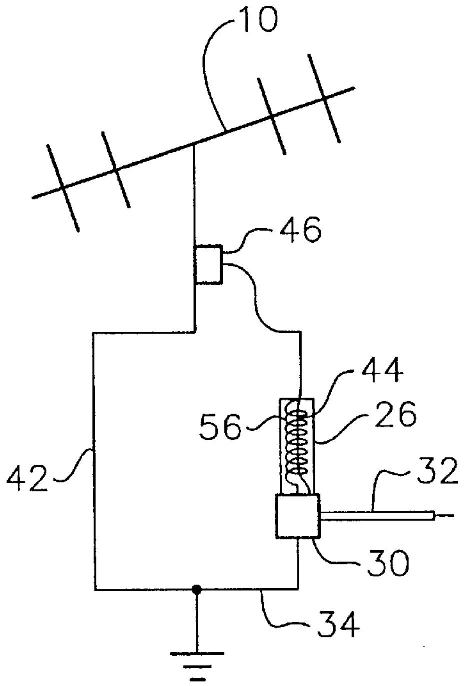
FIG. 2 is a simplified electrical diagram showing the antenna signal transmission and grounding system of the subject invention.

FIG. 2 is similar to FIG. 3, but illustrates some of the details of cable 26. In the communication cable embodiment of this invention, cable 26 is preferably a coaxial cable, although, cable 26 could be a fiber optic cable or twin lead cable. A communication cable must include at least one signal conductor. In the preferred communication cable embodiment of this invention, however, cable 26 is a coaxial cable. FIG. 2 illustrates the center conductor 44. Center conductor 44 is the signal conductor and is connected to terminal box 46 attached to the mast of the antenna 10. Signal conductor 44 is connected through antenna discharge unit 30 to coaxial cable 32. Spiraled choke conductor 56 surrounds signal conductor 44 and is connected to antenna discharge unit 30 which, in turn, is connected to ground conductor 34. Cable 26 will be discussed in more detail below.

Figure 4:
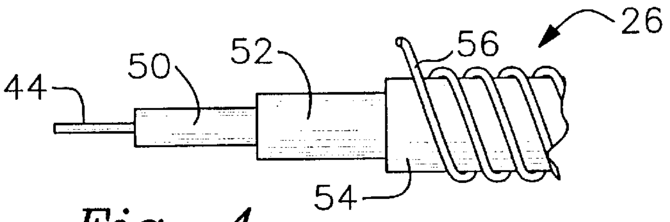
FIG. 4 is a side elevational view of the lightning retardant cable of the subject invention.

FIG. 4 shows lightning retardant cable 26 having signal center conductor 44 which is surrounded by foam dielectric 50. A standard coaxial cable shield 52 surrounds the dielectric 50. Insulated jacket 54 surrounds shield 52. A choke conductor 56 is wound about outer jacket 54 in a spiraled fashion. An overall outer insulated jacket may be placed over the cable to provide protection for the cable. The choke conductor 56 should be large enough to handle the high currents caused by lightning without melting. Choke conductor 56 should be at least 17 gauge and preferably is 10 gauge. Preferably the choke conductor is made of copper. If the choke conductor is made of a bundle of round copper wires, the bundle should be equivalent to at least 17 gauge wire or larger.

Referring now to FIG. 2, if lightning strikes antenna 10, the energy of that strike would normally be split, that is, one-half would follow ground wire 42 and the other half would follow cable 26 to ground rod 39. However, since cable 26 forms an electrical choke due to spiraled choke conductor 56, that is, conductor 56 actually chokes out the flow of current due to its high impedance to lightning current which has a very fast rise time, the majority of the surge follows ground wire 42 to ground and does not follow cable 26 to ground. One-half of the energy from the strike that would start down cable 26 after a lightning strike would quickly be cancelled out by the action of the choke. Each time the choke conductor 56 is twisted around the cable, it causes the electric field generated by the lightning to interact upon itself, thus blocking the flow of current.

Figure 5:
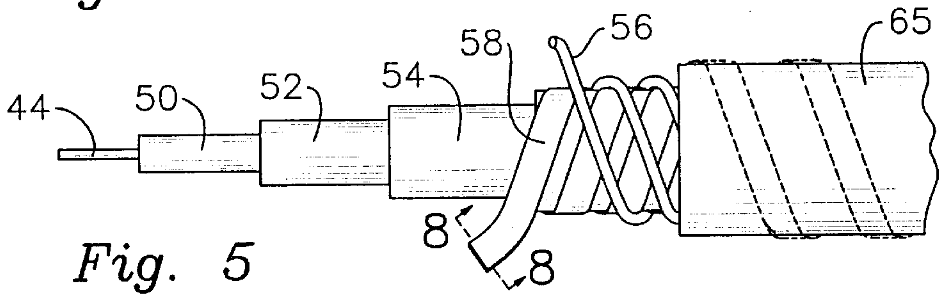
FIG. 5 is a side elevational view of an alternative embodiment of the lightning retardant cable of the subject invention.

As with any electrical discharge, there is an electric field, as well as a magnetic field at right angles to the electric field. Lightning causes a tremendously large magnetic field due to the huge discharge of electric current. FIG. 5 shows an alternative embodiment of the lightning retardant cable of the subject invention which includes a special shield to block the magnetic component of the lightning discharge, thus acting as a Faraday Cage.

In FIG. 5 there is provided a center signal conductor 44, dielectric 50, standard coaxial cable shield 52 and coaxial cable jacket 54. A substantially flat spiraled wrapped shield 58 is wound over the top of coaxial cable jacket 54.

Figure 8:
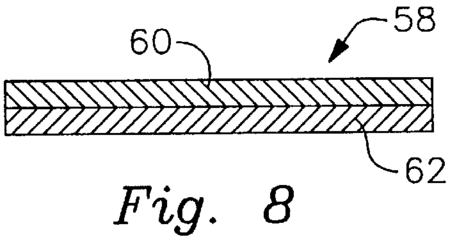
FIG. 8 is a cross sectional view of the spiraled shield of FIGS. 5, 6 and 7.

As shown by a cross section of the spiraled shield 58 in FIG. 8, the shield includes a conductive top metal portion 60 which is insulated by plastic insulation 62 on the bottom. Thus the shield may be spiraled upon itself without causing an electrical short. Metal portion 60 of shield 58 is preferably made of aluminum or copper. Shield 58 is commercially available.

Choke conductor 56 is spiraled over the top of shield 58 in the opposite direction to the spiral of shield 58. Preferably, both shield 58 and choke conductor 56 are spiraled at 45° angles with respect to signal conductor 44. Thus the shield and the choke conductor cross at 90° angles. Alternatively, the spirals for both the choke conductor and the shield could be adjusted to various angles to maximize inductance depending on the desired effect.

Figure 6:
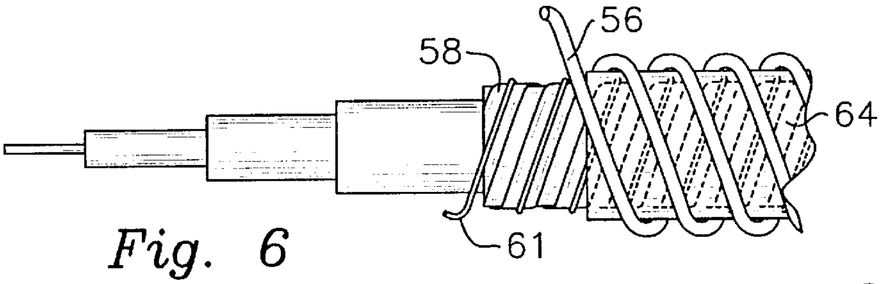
FIG. 6 is a side elevation view of another alternative embodiment of the lightning retardant cable of the subject invention.

In the embodiment of FIG. 5, choke conductor 56 is in electrical contact with the metallic portion 60 of shield 58. However, in the embodiment of FIG. 6, an insulated jacket

64 is provided between spiraled shield 58 and choke conductor 56 and a small drain wire 61 is placed in contact with shield 58 between shield 58 and jacket 64. The drain wire 61 enables one to conveniently terminate the shield. In the design shown in FIGS. 5 through 8, both electric and magnetic fields are addressed. The electric field is addressed by the spiraled choke conductor 56 which, as indicated above, functions as an electrical choke. The magnetic field is addressed by the spiraled shield 58, which acts as a Faraday Cage. Also, the spiraled shield acts as a flat choke in the opposite direction of the spiraled electrical choke 56, thus enhancing the cancellation effect. Therefore, shield 58 has two functions.

As indicated above, preferably, the shield 58 is preferably at a 45° angle with respect to center transmission signal conductor 44 and is spiraled in counterclockwise wrap. The choke conductor 56 is preferably also at a 45° angle with respect to center conductor 44, but is spiraled in the opposite direction around the shield 58, i.e., clockwise. The directions in which the choke conductor and signal conductor are wound could be reversed. The result is a 90° angle between the magnetic shield and the electric choke.

Figure 7:
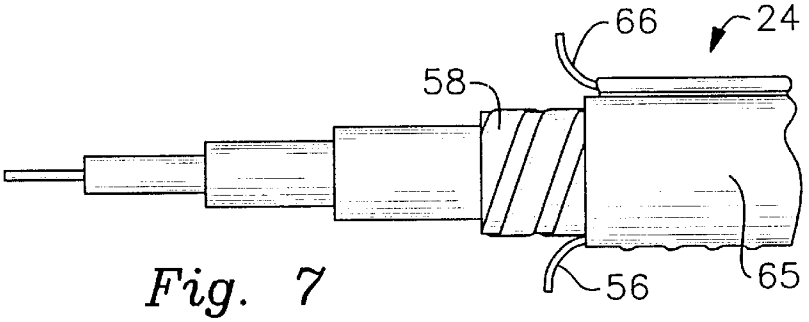
FIG. 7 is a side elevational view of yet another alternative embodiment of the lightning retardant cable of the subject invention.

Referring now more particularly to FIG. 7, for ease of installation, a ground wire 66 may be made as a component of the cable 26. Ground wire 66 is attached to the outer jacket 65 of the cable and is embedded in plastic which forms part of the extruded jacket 65. The ground wire 66 runs the length of the cable. The ground wire is set apart from the main cable so that it may easily be detached and attached to a grounding rod.

The cable shown in FIG. 5 has been tested in the laboratory and in the field. The results show a substantial improvement over the prior art.

Figure 9:
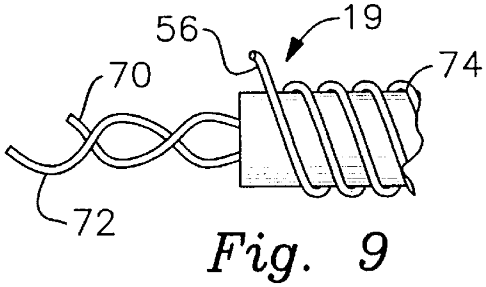
FIG. 9 is a side elevational view of another alternative embodiment of the lightning retardant cable of the subject invention for a power application.

The detailed description above primarily discusses communication cable applications of the invention. FIG. 9 shows a lightning retardant cable 69 of the subject invention for power applications. Internal conductor 70 and 72 are power conducts which are normally heavier gauge than communication conductions. Often a gravel conductor (not shown) is placed adjacent to the power conductors. Conductors 70 and 72 are covered by insulated jacket 74. Choke conductor 56 is spiraled about jacket 74 in the same fashion as shown and described in reference to FIG. 4. In addition, the shield arrangement shown in FIGS. 5, 6 and 7 may also be used in power cable applications.

Figure 10:
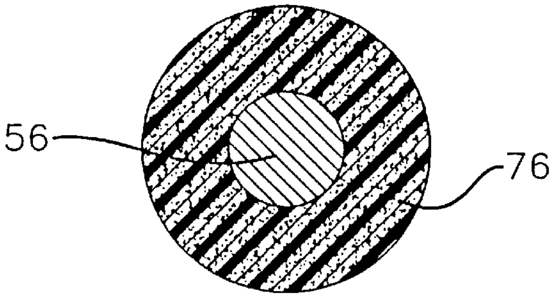
FIG. 10 shows a cross section of an insulated choke conductor which may be used with another embodiment of the invention.

The choke conductor 56 can be insulated with insulation so that it is not in electrical contact with shield 58. This insulation will electrically isolate the choke conductor 56 from shield 58 so that one may separate the electrical and magnetic fields. This will allow one to adjust the two windings, i.e., the shield and the choke, separately for maximum inductance. FIG. 10 shows a cross view of an insulated choke conductor. Item 56 is the choke conductor and item 76 is an insulative jacket.

It may become necessary, depending upon the application, that the choke conductor's insulative jacket 76 be slightly conductive. A compound, such as carbon, can be added to the insulation to increase this conductivity, i.e., to make the insulation semi-conductive.

Figure 11:
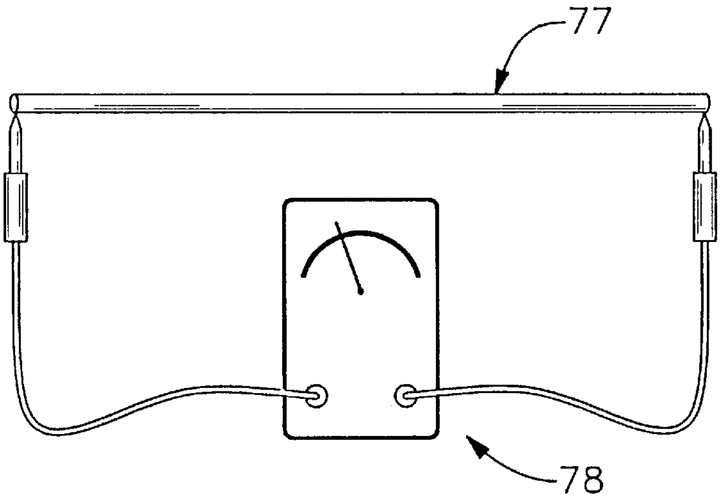
FIG. 11 shows an inductive meter measuring the inductance of a straight wire.
Figure 12:
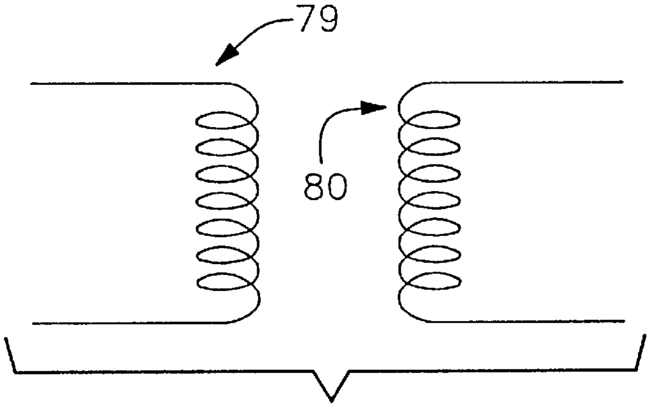
FIG. 12 shows a pair of oppositely wound inductors.
Figure 12A:
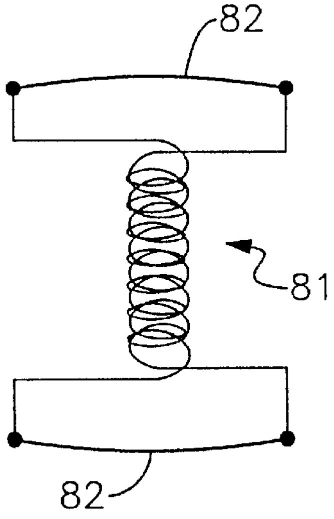
FIG. 12A shows the inductors of FIG. 12 being closely spaced and connected together at their opposing ends.
Figure 12B:
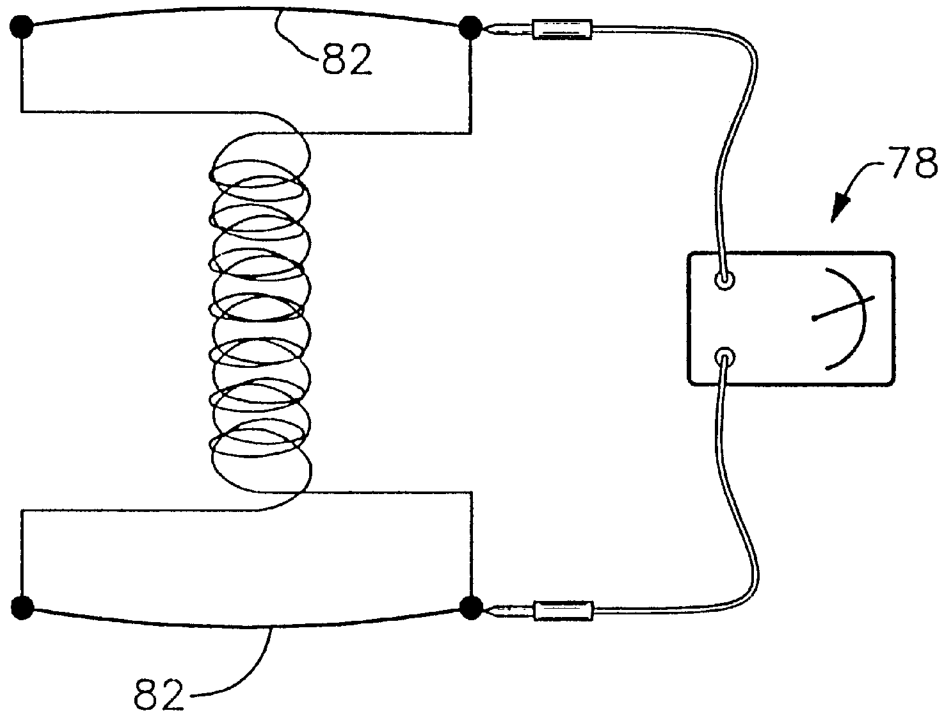
FIG. 12B shows the inductors of FIG. 12A having an inductive meter connected there across.

Lightning will usually follow the path of least resistance or least inductance to ground. Every straight wire has an inductance. To minimize the inductance, you can actually use two coils wound opposite of each other. The fields of these two coils will cancel out each other and result in "0" induction. In FIG. 11, item 78 illustrates an inductive meter measuring the inductance of a straight wire 77. In FIG. 12, items 79 and 80 illustrate inductors. If the second inductor 80 is wound opposite inductor 79, as shown by 81 in FIG. 12A, and the two are electrically connected at both ends 82, then the inductance should read "0", as illustrated by meter 78 in FIG. 12B.

Figure 13:
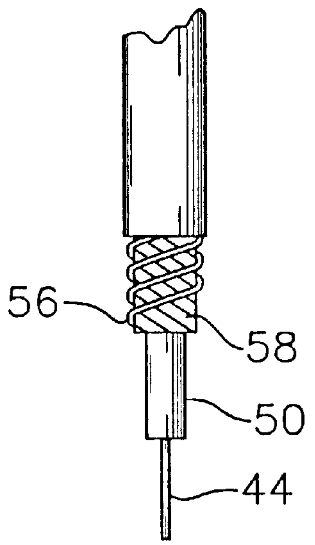
FIG. 13 shows the cable which utilizes the choke conductor construction of FIG. 10, wherein only one end of the choke conductor is connected to one end of the shield.

Certain applications of lightning retardant cable may be enhanced if only one end of the cable has the choke 56 connected or grounded to shield 58. This allows the shield to function as a Faraday cage shielding the inner coax or wires from the magnetic fields of any induced energy. FIG. 13 illustrates this construction. In this illustration, choke 56 and shield 58 are in electrical contact at one end of the cable only. This can be accomplished by winding the choke 56 around shield 58 so that they are in mechanical and electrical contact, as illustrated in FIG. 14.

Figure 14:
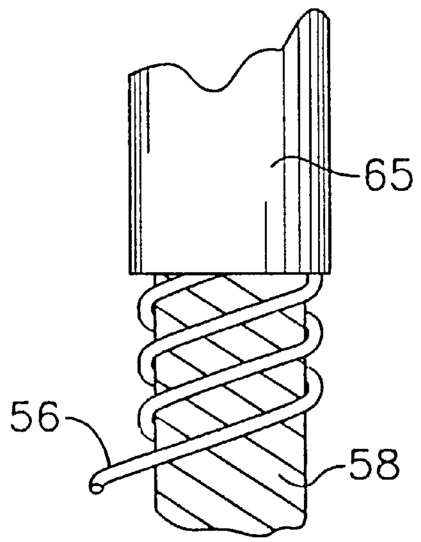
FIG. 14 is a more detailed view of the cable of FIG. 13.

FIG. 14 shows a cross view of cable 65. Item 58 is the spiral shield wrapped so that there is 100% full overlapping coverage. Choke 56 is stripped of insulation and wrapped around shield 58 so that it is in mechanical and electrical contact.

From the foregoing description of the preferred embodiments of the invention, it will be apparent that many modifications may be made therein. It will be understood, however, that the embodiments of the invention are exemplifications of the invention only and that the invention is not limited thereto. It is to be understood therefore that it is intended in the appended claims to cover all modifications as fall within the true spirit and scope of the invention.

I claim:

1. A lightning retardant cable comprising:

at least one internal conductor;

a choke conductor; said choke conductor wound about said internal conductor in the shape of a spiral; said choke conductor not being in direct contact with said internal conductor; said choke conductor presenting a high impedance to electrical current caused by lightning when lightning strikes near said cable;

a spiraled shield; said spiraled shield being wound about said internal conductor in a direction which is opposite to the direction in which said choke conductor is wound; said choke conductor and said spiraled shield each having first and second ends; said first end of said choke conductor connected to said first end of said spiraled shield, and said second end of said choke conductor connected to said second end of said spiraled shield;

magnetic fields being formed by said choke conductor and said spiraled shield when current flows through said choke conductor and said spiraled shield due to a lightning strike near said cable; said magnetic fields being substantially cancelled, thereby reducing the damaging effects of the lightning strike.

2. A cable as set forth in claim 1, wherein said internal conductor is made of a material which conducts electrical current.

3. A cable as set forth in claim 2, wherein said internal conductor is a power conductor.

4. A cable as set forth in claim 2, further including an electrical insulation layer located between said internal conductor and said choke conductor.

5. A cable as set forth in claim 1, wherein said internal conductor is a signal conductor.

6. A cable as set forth in claim 5, wherein said signal conductor is at least one optical fiber for conducting light.

7. A cable as set forth in claim 1, wherein said choke conductor has a diameter of at least 17 gauge.

8. A cable as set forth in claim 7, wherein said internal conductor is a signal conductor; a coaxial cable shield surrounding said signal conductor, whereby said cable is a coaxial cable.

9. A cable as set forth in claim 1, wherein said choke conductor is spiraled at an angle of approximately 45° with respect to said internal conductor.

10. A cable as set forth in claim 1, wherein said spiraled shield is in the form of a flat conductor; at least one side of said flat conductor having electrical insulation attached thereto.

11. A cable as set forth in claim 10, further including an insulation layer located between said choke conductor and said spiraled shield.

12. A cable as set forth in claim 1, further including a layer of insulation surrounding said choke conductor.

13. A cable as set forth in claim 12, wherein said insulation layer surrounding said choke conductor includes an amount of conductive material, whereby said insulation layer is semi-conductive.

14. A cable as set forth in claim 13, further including an outer jacket covering said cable.

15. A cable as set forth in claim 14, further including a ground conductor; said ground conductor attached to the said outer jacket.

16. A cable as set forth in claim 13, wherein the spiral angles of said choke conductor and said shield may be adjusted to maximize inductance.

17. A cable as set forth in claim 12, wherein said spiraled shield and said choke conductor cross one another at an angle of approximately 90°.

18. A cable as set forth in claim 1, further including a ground conductor.

19. An antenna signal transmission and grounding system comprising:

a lightning retardant cable; said cable including at least one signal conductor; said signal conductor for conducting a signal containing information;

a choke conductor; said choke conductor wound about said signal conductor in the shape of a spiral; said choke conductor presenting a high impedance to electrical current caused by lightning when lightning strikes near said cable;

a spiraled shield; said spiraled shield being wound about said signal conductor in a direction opposite to the direction in which said choke conductor is wound; said spiraled shield not in direct contact with said signal conductor; said choke conductor and said spiraled shield each having first and second ends; said first end of said choke conductor connected to said first end of said spiraled shield, and said second end of said choke conductor connected to said second end of said spiraled shield;

magnetic fields being formed by said choke conductor and said spiraled shield when current flows through said choke conductor and said spiraled shield due to a lightning strike near said cable; said magnetic fields being substantially cancelled, thereby reducing the damaging effects of the lightning strike.

20. A system as set forth in claim 19, wherein said signal conductor is made of a metallic material which conducts electrical current; an electrical insulation layer located between said signal conductor and said choke conductor.

21. A system as set forth in claim 19, further including a layer of insulation surrounding said choke conductor.

22. A system as set forth in claim 21, wherein said insulation layer surrounding said choke conductor includes an amount of conductive material, whereby said insulation layer is semi-conductive.

23. A system as set forth in claim 19, wherein said spiraled shield and said choke conductor cross one another at an angle of approximately 90°.

24. An antenna signal transmission and grounding system comprising:

a lightning retardant cable; said cable including at least one signal conductor; said signal conductor for conducting a signal containing information;

a choke conductor; said choke conductor wound about said signal conductor in the shape of a spiral; said choke conductor presenting a high impedance to electrical current caused by lightning when lightning strikes near said cable;

a spiraled shield adjacent to said choke conductor; said spiraled shield being wound about said signal conductor; said spiraled shield and said choke conductor being wound in opposites directions; each end of said choke conductor connected to an adjacent end of said spiraled shield; an overall outer jacket covering said cable; a ground conductor; said ground conductor attached to said overall outer jacket.

* * * * *